United States Patent
Saitou et al.

(10) Patent No.: US 10,456,932 B2
(45) Date of Patent: Oct. 29, 2019

(54) CONDUCTION PATH STRUCTURE OF ROBOT

(71) Applicant: FANUC CORPORATION, Yamanashi (JP)

(72) Inventors: Sou Saitou, Yamanashi (JP); Tsutomu Shikagawa, Yamanashi (JP); Kiichi Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 96 days.

(21) Appl. No.: 15/828,484

(22) Filed: Dec. 1, 2017

(65) Prior Publication Data

US 2018/0154528 A1    Jun. 7, 2018

(30) Foreign Application Priority Data

Dec. 6, 2016    (JP) .................................. 2016-236781

(51) Int. Cl.
| | |
|---|---|
| *B25J 19/00* | (2006.01) |
| *B25J 18/00* | (2006.01) |
| *B25J 19/06* | (2006.01) |

(52) U.S. Cl.
CPC .......... *B25J 19/0075* (2013.01); *B25J 18/00* (2013.01); *B25J 19/0029* (2013.01); *B25J 19/06* (2013.01); *B25J 19/063* (2013.01)

(58) Field of Classification Search
CPC .... B25J 19/0075; B25J 18/00; B25J 19/0029; B25J 19/06; B25J 19/063
See application file for complete search history.

(56) References Cited

U.S. PATENT DOCUMENTS

| 4,567,321 | A | * | 1/1986 | Harayama | ............ H01B 7/0838 |
| | | | | | 174/113 C |
| 4,854,808 | A | * | 8/1989 | Bisiach | ...................... B25J 9/04 |
| | | | | | 414/680 |
| 5,794,487 | A | * | 8/1998 | Solomon | .................. B25J 9/042 |
| | | | | | 277/378 |

FOREIGN PATENT DOCUMENTS

| CN | 2278256 Y | 4/1998 |
| CN | 104044141 A | 9/2014 |
| CN | 105935850 A | 9/2016 |
| JP | S60-094295 A | 5/1985 |
| JP | H07-328983 A | 12/1995 |
| JP | H11-226062 A | 8/1999 |
| JP | 2009-113188 A | 5/2009 |

(Continued)

OTHER PUBLICATIONS

An Office Action issued by the China National Intellectual Property Administration dated Dec. 17, 2018, which corresponds to Chinese Patent Application No. 201711262849.6 and is related to U.S. Appl. No. 15/828,484.

(Continued)

*Primary Examiner* — Thomas C Diaz
(74) *Attorney, Agent, or Firm* — Studebaker & Brackett PC

(57) ABSTRACT

A conduction path structure of a robot in which a conduction path has a simplified structure is provided. A conduction path structure of a robot includes: a structural mechanism which functions as a support and has a conductor portion; an actuator that operates the structural mechanism; and a conduction path through which driving power and/or a control signal is supplied to the actuator, wherein the conduction path also serves as the conductor portion of the structural mechanism.

5 Claims, 5 Drawing Sheets

(56) References Cited

FOREIGN PATENT DOCUMENTS

| JP | 2010-125546 A | 6/2010 |
| JP | 2014-100753 A | 6/2014 |

OTHER PUBLICATIONS

Office Action corresponding to Japanese Patent Application No. 2016-236781; mailed by the Japanese Patent Office dated Jun. 19, 2018.

* cited by examiner

CONDUCTION PATH STRUCTURE OF ROBOT

This application is based on and claims the benefit of priority from Japanese Patent Application No. 2016-236781, filed on 6 Dec. 2016, the content of which is incorporated herein by reference.

BACKGROUND OF THE INVENTION

Field of the Invention

The present invention relates to a conduction path structure of a robot, forming conduction paths for driving power and a control signal.

Related Art

With regard to a work robot that performs a machining operation on a work, a technology for preventing wires extending from a base end-side rotation shaft to a distal end-side rotation shaft from getting tangled is proposed (see Patent Document 1). In the technology disclosed in Patent Document 1, wires are accommodated in a housing provided in an arm member to prevent the wires from getting tangled. On the other hand, a technology of covering a caring robot arm with a flexible material to improve safety is proposed (see Patent Document 2). In the technology disclosed in Patent Document 2, a surface layer of a hand close to the distal end of the arm is covered with a flexible material.

Patent Document 1: Japanese Unexamined Patent Application, Publication No. 2009-113188
Patent Document 2: Japanese Unexamined Patent Application, Publication No. H11-226062

SUMMARY OF THE INVENTION

In the technology of Patent Document 1, since wires pass through a housing provided in an arm member, it is difficult to handle the wires during assembling. Moreover, in the technology of Patent Document 2, although a predetermined portion of the robot arm is covered by a flexible material, wires connected to an actuator of the hand have to pass through the flexible material. Due to this, so-called double insulation is applied to a portion covered with the flexible material, which is redundant.

With the foregoing in view, an object of the present invention is to provide a conduction path structure of a robot, in which the conduction path has a simple structure.

(1) A conduction path structure of a robot (for example, a robot 1 to be described later) of the present invention is a conduction path structure of a robot including: a structural mechanism (for example, a structural mechanism 100 to be described later) which functions as a support and has a conductor portion (for example, conductive structural members 611 to 613, 621 to 623, 631 to 633, and 641 to 643 to be described later); an actuator (for example, first, second, and third actuators 31, 32, and 33 to be described later) that operates the structural mechanism; and a conduction path (for example, first, second, and third groups of conduction paths 61, 62, and 63 to be described later) through which driving power and/or a control signal is supplied to the actuator, wherein the conduction path also serves as the conductor portion of the structural mechanism.

(2) In one aspect of the conduction path structure of the robot according to (1), the structural mechanism may further include a cover (for example, first, second, and third coating members 51, 52, and 53 to be described later) that covers an outer surface of the structural mechanism and is formed of an insulating flexible material.

(3) In one aspect of the conduction path structure of the robot according to (1) or (2), the structural mechanism may form an arm (for example, first, second, and third arms 11, 12, and 13 to be described later) of the robot in which a plurality of conductive structural members (for example, conductive structural members 611 to 613, 621 to 623, 631 to 633, and 641 to 643 to be described later) as the conductor portion, serving as electrically independent conduction paths are coupled with an insulating member (for example, a structure adhesive 650 to be described later) interposed therebetween.

(4) In one aspect of the conduction path structure of the robot according to (3), the conduction path of the arm may form a power supply conductor that supplies an output of a power supply source (for example, a power supply 4 to be described later) to a motor (for example, first, second, and third motors 41, 42, and 43 to be described later) which is a driving source of the actuator.

(5) In one aspect of the conduction path structure of the robot according to (3), the conduction path of the arm may form a control signal conductor (for example, conductive structural members 641 to 643 to be described later) that supplies a control signal to the actuator.

According to the present invention, it is possible to realize a conduction path structure of a robot, in which the conduction path has a simple structure.

DETAILED DESCRIPTION OF THE INVENTION

Figure 1:
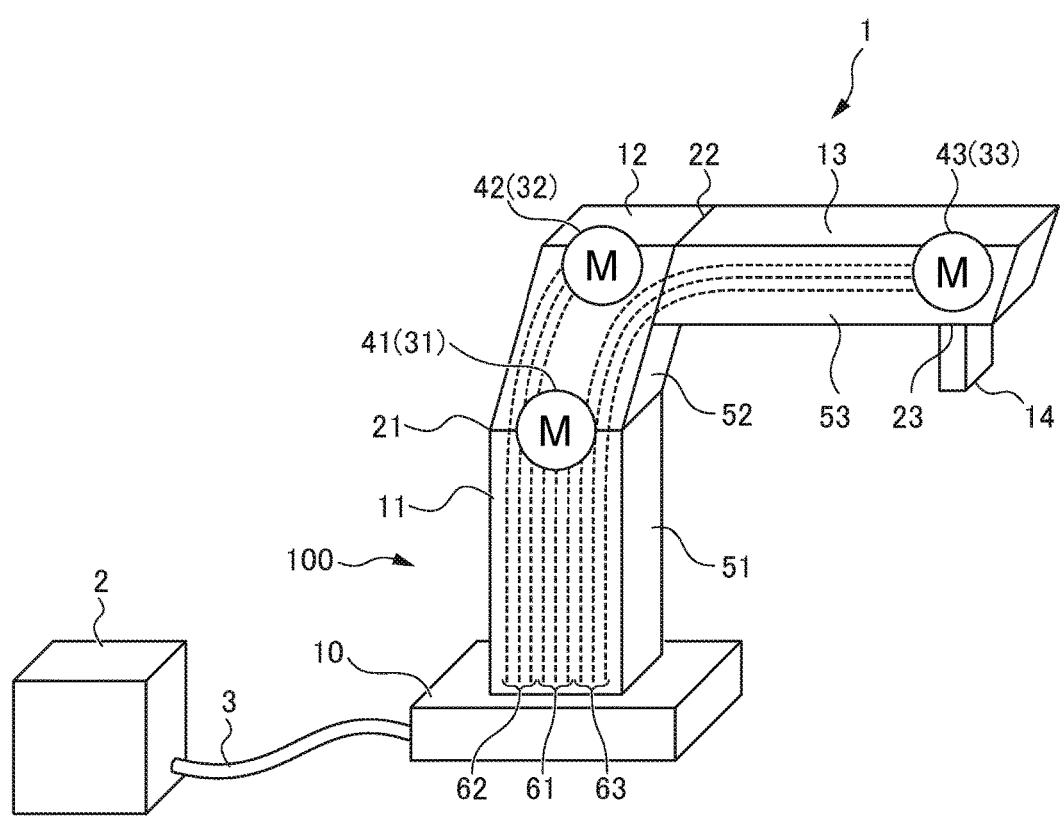
FIG. 1 is a conceptual diagram illustrating a conduction path structure of a robot according to an embodiment of the present invention.

A conduction path structure of a robot according to an embodiment of the present invention will be described with reference to FIG. 1. FIG. 1 is a conceptual diagram illustrating a conduction path structure of a robot according to an embodiment of the present invention. In a robot 1 illustrated in FIG. 1, a first arm 11 which is a revolving body is provided on a base portion 10, a second arm 12 and a second arm 13 are provided at the distal end of the first arm 11 in that order with a joint interposed therebetween, and a hand 14 is provided at the distal end of the third arm 13 with a joint interposed therebetween.

The first, second, and third arms 11, 12, and 13 form a structural mechanism 100 of the robot 1. The structural mechanism 100 includes a base portion 10 and joints (21, 22, 23) to be described later in addition to the above-described components. A first joint 21 between the first arm 11 and the second arm 12 is operated by a first actuator 31. Similarly, a second joint 22 between the second arm 12 and the third arm 13 is operated by a second actuator 32. Furthermore, a third joint 23 between the third arm 13 and the hand 14 is operated by a third actuator 33.

In the present embodiment, the first, second, and third actuators 31, 32, and 33 are configured using a motor as a driving source. That is, the first actuator 31 uses a first motor 41 as a driving source, the second actuator 32 uses a second motor 42 as a driving source, and the third actuator 33 uses a third motor 43 as a driving source. Driving power of each motor and a necessary control signal are supplied from a control device 2 to the above-described base portion 10 through a cable 3.

The robot 1 of the present embodiment is a so-called cooperating robot that operates while sharing a work area with a person. In order to enhance safety when a person touch the robot 1, the surfaces of the first, second, and third arms 11, 12, and 13 are covered with corresponding first, second, and third coating members 51, 52, and 53, respectively. The first, second, and third coating members 51, 52, and 53 are covers formed of an insulating flexible material. This cover is preferably formed of a material having excellent heat-resistant and heat-insulating properties. Furthermore, the first, second, and third joints 21, 22, and 23 are also covered with a cover similar to the above-described cover. These covers may have a contact sensor on the surface thereof in order to enhance safety when a person touches the robot 1.

The robot 1 of the present embodiment has conduction paths for supplying electric power to the first, second, and third motors 41, 42, and 43 which are the driving sources of the first, second, and third actuators 31, 32, and 33, respectively. Particularly, in the present embodiment, these conduction paths also serve as conductor portions of the above-described structural mechanism.

That is, the structural mechanism functions as a support and has a plurality of conductor portions. The expression "functioning as a support" means that the structural mechanism in itself has sufficient rigidity and functions as a so-called skeletal portion. More specifically, the structural mechanism has arms (the first, second, and third arms: 11, 12, and 13) to which a plurality of conductive structural members as conductor portions are coupled with an insulating member interposed therebetween. These arms (the first, second, and third arms: 11, 12, and 13) form conduction paths in which the respective conductive structural members are electrically independent.

These conduction paths are schematically depicted by broken lines in FIG. 1. A first group of conduction paths 61, a second group of conduction paths 62, and a third group of conduction paths 63 are provided as conduction paths that supply electric power to the first, second, and third motors 41, 42, and 43, respectively. As depicted by broken lines in the drawing, the first, second, and third groups of conduction paths 61, 62, and 63 each form a conduction path in which three conductive structural members are electrically independent.

Therefore, the first arm 11 includes the first group of conduction path 61 that supplies electric power to the first motor 41, the second group of conduction paths 62 that supplies electric power to the second motor 42, and the third group of conduction paths 63 that supplies electric power to the third motor and forms a conduction path in which at least nine conductive structural members in total are electrically independent.

The second arm 12 includes the second group of conduction paths 62 that supplies electric power to the second motor 42 and the third group of conduction paths 63 that supplies electric power to the third motor and forms a conduction path in which at least six conductive structural members in total are electrically independent.

The third arm 13 includes the third group of conduction paths 63 that supplies electric power to the third motor 43 and forms a conduction path in which at least three conductive structural members in total are electrically independent.

As described above, the arms (the first, second, and third arms: 11, 12, and 13) have the plurality of conductive structural members coupled with an insulating member interposed therebetween and form a conduction path in which the respective conductive structural members are electrically independent. A configuration of such an arm will be described with reference to FIG. 2.

Figure 2:
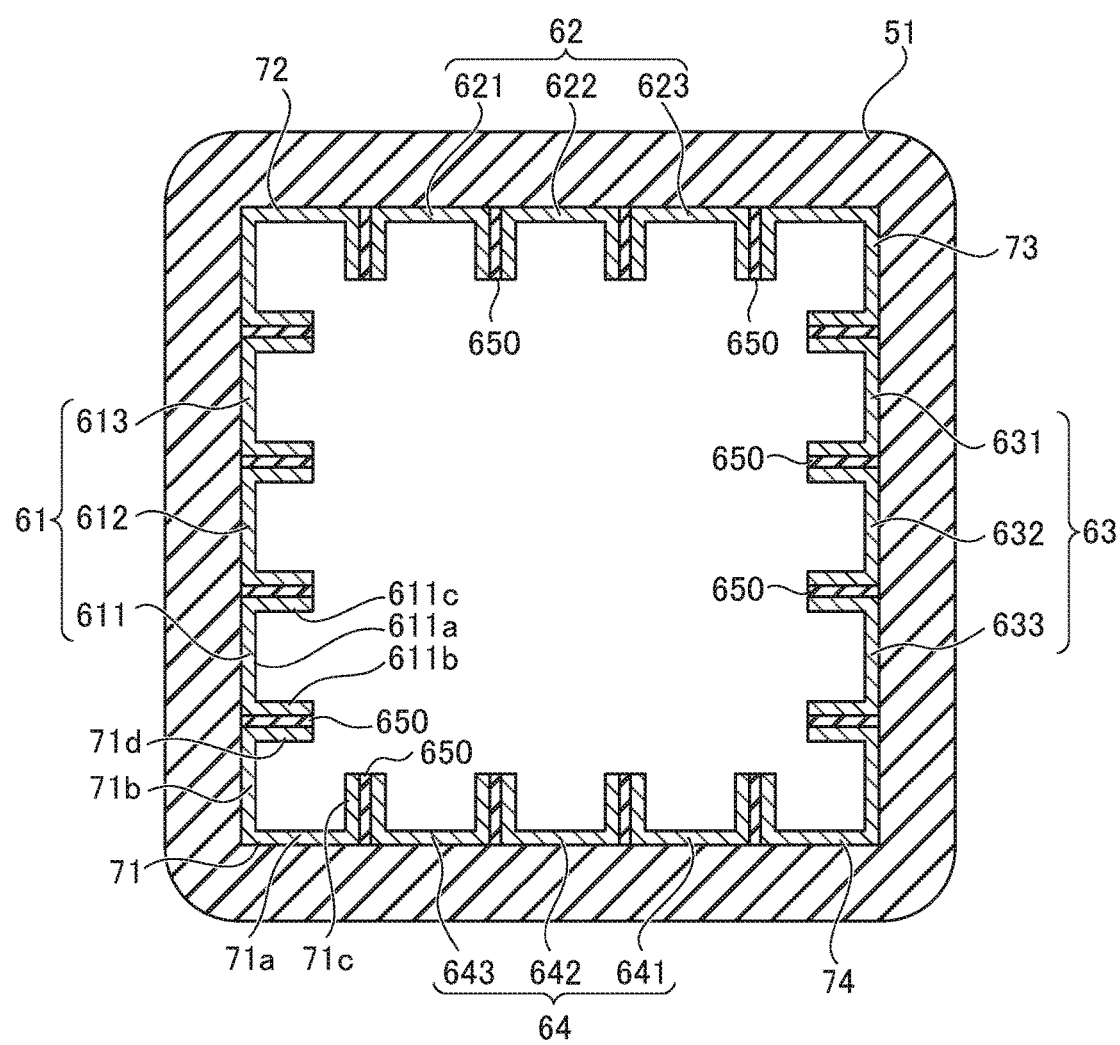
FIG. 2 is a cross-sectional view illustrating an example of an arm in the conduction path structure of the robot illustrated in FIG. 1.

FIG. 2 is a cross-sectional view illustrating an example of an arm in the conduction path structure of the robot 1 illustrated in FIG. 1. FIG. 2 illustrates an example of the first arm 11 as a representative example of the arms (the first, second, and third arms: 11, 12, and 13). As illustrated in FIG. 2, a cross-section of the first arm 11 is generally hollow and has an approximately square contour. An outer circumference of the first arm 11 is covered by the first coating member 51 described with reference to FIG. 1. Conductor portions that form a skeletal portion of the robot arm as a structural body are arranged inside the first arm 11 in an approximately square form.

Referring to FIG. 2, the corner structural members 71, 72, 73, and 74 are provided at four corners of the approximately square arrangement of the structural members of the skeletal portion of the first arm 11. The cross-sections of the four corner structural members 71, 72, 73, and 74 have approximately the same shapes as illustrated in the drawing. As a representative example, a sectional shape of the corner structural member 71 has structural plates 71a and 71b extending by predetermined equal widths along one side and an adjacent side at right angles from a corner of the square shape and two bonding plates 71c and 71d bent at right angles toward the inner side of the square shape from extension edges of the structural plates 71a and 71b. An assembly of three conductive structural members 611, 612, and 613 that form the first group of conduction paths 61 is disposed between the two corner structural members 71 and 72 of the cross-section of the first arm 11. That is, this assembly forms a structural member that connects the two corner structural members 71 and 72.

The conductive structural members 611, 612, and 613 has approximately the same shape and dimensions. As a representative example, a sectional shape of the conductive structural member 611 includes a structural plate 611a having a predetermined width extending along one side of the square and two bonding plates 611b and 611c bent at right angles toward the inner side of the square from both ends of the structural plate 611a. In the conductive structural members 611, 612, and 613, opposing bonding plates of the assembly arranged in a line are bonded by an insulating structure adhesive 650. Furthermore, bonding plates positioned at both ends of this assembly are bonded by the insulating structure adhesive 650 and the bonding plates of the corresponding corner structural members 71 and 72. Although reference numerals are assigned to the partial structure adhesive 650 in FIG. 2, the insulating structure adhesive is similarly used in bonding between the bonding plates.

The structure between the two corner structural members 71 and 72 in the skeletal portion of the first arm 11 is similarly applied to the structure between the corner structural members 72 and 73, the structure between the corner structural members 73 and 74, and the structure between the corner structural members 74 and 71. That is, an assembly of three conductive structural members 621, 622, and 623 that form the second group of conduction paths 62 is disposed between the corner structural members 72 and 73, and this assembly forms a structural member that connects the two corner structural members 72 and 73. Three conductive structural members 621, 622, and 623 are bonded by the insulating structure adhesive 650 and the assembly and both corner structural members 72 and 73 are bonded by the insulating structure adhesive 650 similarly to the corner structural members 71 and 72.

Moreover, an assembly of three conductive structural members 631, 632, and 633 that form the third group of conduction paths 63 is disposed between the corner structural members 73 and 74, and this assembly forms a structural member that connects the two corner structural members 73 and 74. Three conductive structural members 631, 632, and 633 are bonded by the insulating structure adhesive 650 and the assembly and both corner structural members 73 and 74 are bonded by the insulating structure adhesive 650 similarly to the corner structural members 71 and 72.

Furthermore, an assembly of three conductive structural members 641, 642, and 643 that form the fourth group of conduction paths 64 is disposed between the corner structural members 74 and 71, and this assembly forms a structural member that connects the two corner structural members 74 and 71. Three conductive structural members 641, 642, and 643 are bonded by the insulating structure adhesive 650 and the assembly and both corner structural members 74 and 71 are bonded by the insulating structure adhesive 650 similarly to the corner structural members 71 and 72.

In the present embodiment, the conductive structural members 611, 612, and 613 that form the first group of conduction paths 61, the conductive structural members 621, 622, and 623 that form the second group of conduction paths 62, the conductive structural members 631, 632, and 633 that form the third group of conduction paths 63, and the conductive structural members 641, 642, and 643 that form the fourth group of conduction paths 64 are preferably formed of a metal material having excellent mechanical strength and such high conductivity as to be suitable for electric wires such as I-go aluminum alloy wire (JEC-3405-2010), for example. All or some of the corner structural members 71, 72, 73, and 74 may be formed of the above-described metal material.

The corner structural members 71, 72, 73, and 74, and the conductive structural members 611 to 613, 621 to 623, 631 to 633, and 641 to 643 described for the first arm 11 with reference to the cross-sectional view of FIG. 2 have longitudinal lengths corresponding to approximately the entire length of the first arm 11. The second and third arms 12 and 13 described with reference to FIG. 1 may have configurations approximately similar to that of the first arm 11 described with reference to the cross-sectional view of FIG. 2.

However, in the second arm 12, a rigid member having low conductivity may be used instead of the conductive structural member of the first group of conduction paths 61 of the above-described first arm 11. Moreover, in the third arm 13, a rigid member having low conductivity may be used instead of the conductive structural member of the first and second groups of conduction paths 61 and 62 of the above-described first arm 11.

Moreover, when the number of conductive structural members in the second arm 12 is smaller than that of the first group of conduction paths 61 of the first arm 11, a planar structural member that integrally couples the corner structural members 71 and 72 may be used without providing the conductive structural members 611, 612, and 613 that form the first group of conduction paths 61 of the first arm 11.

When the number of conductive structural members in the third arm 13 is smaller than that of the first group of conduction paths 61 of the first arm 11, in addition to using the planar structural member as described for the second arm 12, a planar structural member that integrally couples the corner structural members 72 and 73 may be used without providing the conductive structural members 621, 622, and 623 that form the second group of conduction paths 62 of the first arm 11.

On the other hand, the second and third arms 12 and 13 may have configurations similar to that of the first arm 11 and electric wires may be connected to conductive structural members which are actually used as conduction paths only.

Moreover, electric connection from respective terminals (not shown) in which the ends of conductors of the cable 3 are fitted inside the base portion 10 illustrated in FIG. 1 to the conductive structural members 611, 612, and 613 of the first group of conduction paths 61 of the first arm 11 can be realized using flexible bonding wires appropriately. Similarly, electric connection from the conductive structural members 621, 622, and 623 of the second group of conduction paths of the first arm 11 and the conductive structural members 631, 632, and 633 of the third group of conduction paths to the conductive structural members of the corresponding conduction paths of the second arm 12 can be realized using flexible bonding wires appropriately. Furthermore, electric connection between the corresponding conductive structural members of the corresponding conduction paths of the second and third arms 12 and 13 can be realized using flexible bonding wires appropriately.

The conductive structural members of the first, second, and third arms 11, 12, and 13 are insulated by the insulating structure adhesive 650 and the respective conductive structural members form electrically independent conduction paths. Moreover, the outer circumferences of the first, second, and third arms 11, 12, and 13 are covered by the first, second, and third coating members 51, 52, and 53 which are covers formed of an insulating flexible material, the arms are insulated from the outside appropriately. A cavity may be formed in a partial portion of each of the first, second, and third coating members 51, 52, and 53, and the cavity may be used as an insertion space for bonding wires and may enhance the function as a shock absorbing material.

The first, second, and third groups of conduction paths 61, 62, and 63 among the conduction paths described with reference to FIG. 2 are used for supplying electric power for driving the corresponding first, second, and third motors 41, 42, and 43, respectively. In contrast, the fourth group of conduction paths 64 is used for supplying a control signal and is not particularly necessary depending on a drive control method of the motor. An example of a case where the fourth group of conduction paths 64 is used will be described with reference to FIGS. 4 and 5.

Next, an electric configuration of conduction paths of the conduction path structure of the robot 1 described with reference to FIGS. 1 and 2 will be described. In the conduction path structures of the first, second, and third arms 11, 12, and 13 of the robot 1, the conduction paths to the corresponding first, second, and third motors 41, 42, and 43 are similar. Therefore, the conduction path structure to the first motor 41 in the first arm 11 of the robot 1 will be described as a representative example.

Figure 3:
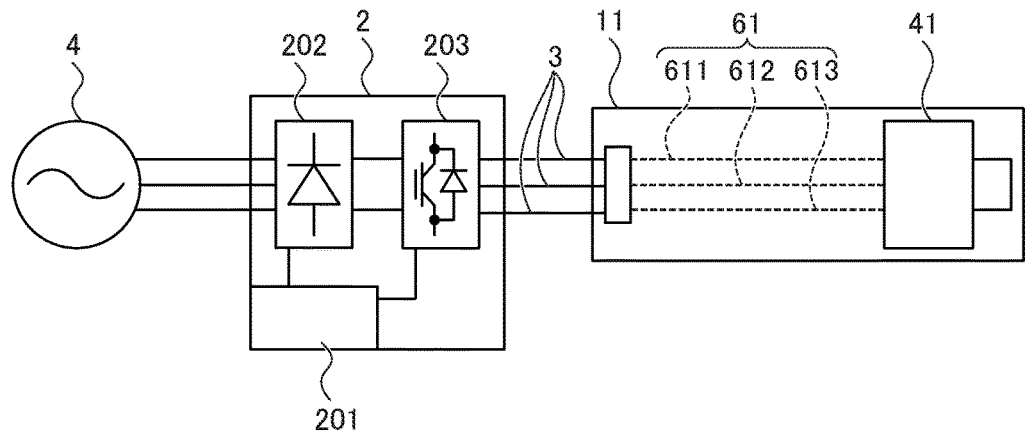
FIG. 3 is a diagram of an electrical system illustrating an example of a case in which electric power is supplied to a motor which is a driving source of an actuator by the conduction path structure of a robot illustrated in FIG. 1.

FIG. 3 is a diagram of an electrical system illustrating an example of a case in which electric power is supplied to a motor which is a driving source of an actuator by the conduction path structure of the robot illustrated in FIG. 1. In FIG. 3, the control device 2 converts AC electric power supplied from a three-phase AC power supply 4 to DC electric power with the aid of a converter 202 under the control of a control unit 201 and then converts the DC electric power to AC electric power having necessary frequency and voltage with the aid of an inverter 203 in the next stage. This AC electric power is supplied to the first motor 41 through the conductive structural members 611, 612, and 613 of the above-described first group of conduction paths 61 of the first arm 11 through the cable 3.

Figure 4:
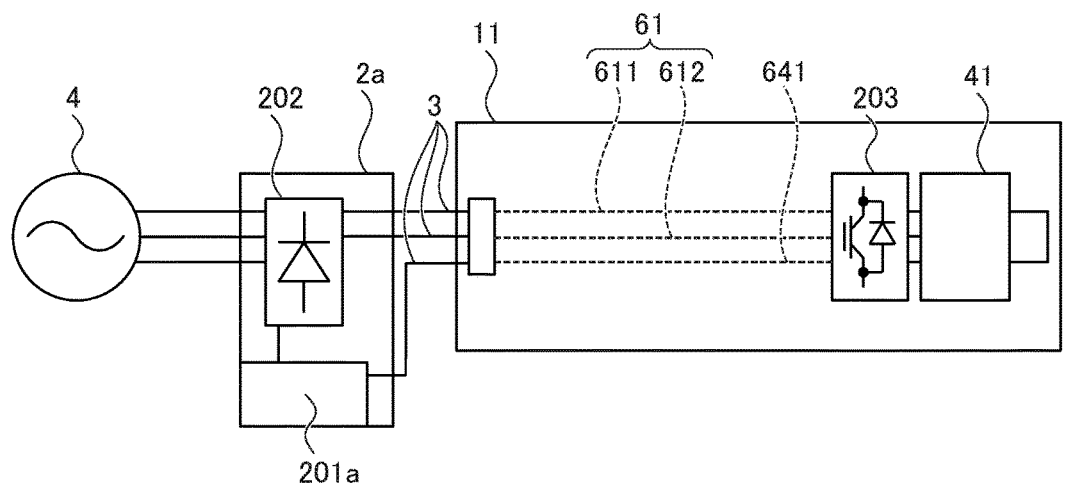
FIG. 4 is a diagram of an electrical system illustrating another example of a case in which electric power is supplied to a motor which is a driving source of an actuator by the conduction path structure of a robot illustrated in FIG. 1.

FIG. 4 is a diagram of an electrical system illustrating another example of a case in which electric power is supplied to a motor which is a driving source of an actuator by the conduction path structure of the robot illustrated in FIG. 1. FIG. 4 is different from FIG. 3 in that the inverter 203 is disposed on a side of the first motor 41, and a control signal and a DC link voltage which is an output of the converter 202 are supplied to the inverter 203. That is, a control device 2a converts AC electric power supplied from the three-phase AC power supply 4 to DC electric power with the aid of the converter 202 under the control of a control unit 201a to obtain a DC link voltage and then supplies the DC link voltage to the inverter 203 through the cable 3 and the conductive structural members 611 and 612 of the above-described first group of conduction paths 61 of the first arm 11. Moreover, the control device 2a supplies a control signal which is an output of the control unit 201a to a control terminal of the inverter 203 through the cable 3 and one conductive structural member 641 of the fourth group of conduction paths described with reference to FIG. 2. In this way, the electric power converted to AC electric power having necessary frequency and voltage by the inverter 203 is supplied to the first motor 41.

Figure 5:
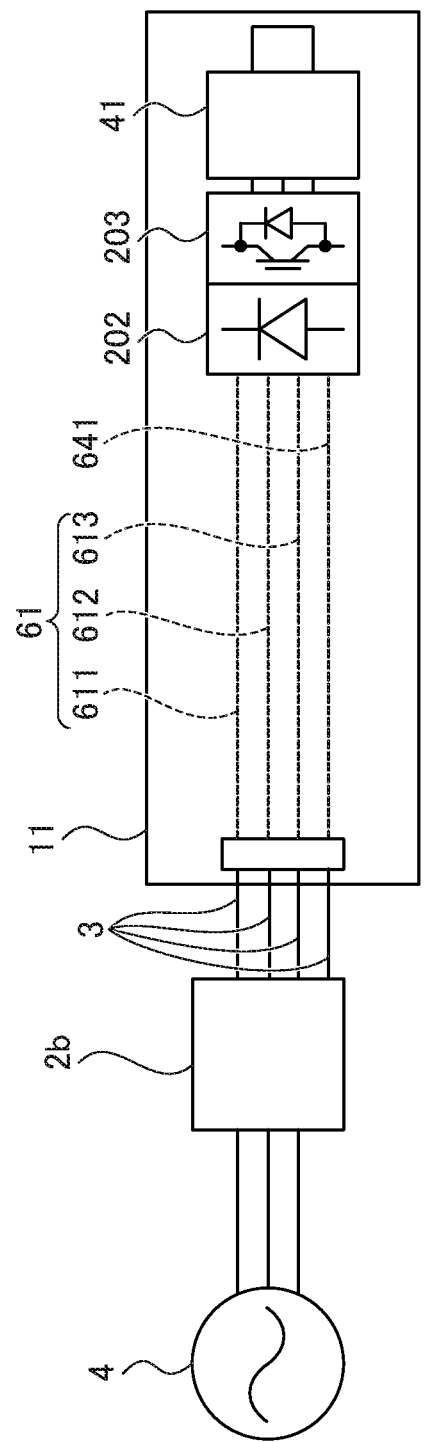
FIG. 5 is a diagram of an electrical system illustrating still another example of a case in which electric power is supplied to a motor which is a driving source of an actuator by the conduction path structure of a robot illustrated in FIG. 1.

FIG. 5 is a diagram of an electrical system illustrating still another example of a case in which electric power is supplied to a motor which is a driving source of an actuator by the conduction path structure of the robot illustrated in FIG. 1. FIG. 5 is different from FIG. 3 in that the converter 202 and the inverter 203 are disposed on a side of the first motor 41. In this case, a control device 2b supplies AC electric power to the converter 202 through the cable 3 and the conductive structural members 611, 612, and 613 of the above-described first group of conduction paths 61. Moreover, the control device 2b functions like the control unit 201 illustrated in FIG. 3 and supplies a control signal to the converter 202 and the inverter 203. Supply of the control signal through one conductive structural member 641 of the fourth group of conduction paths described with reference to FIG. 2 is performed as will be described later with reference to FIG. 6. The electric power converted to the AC electric power having necessary frequency and voltage by the converter 202 and the inverter 203 operating in accordance with the control signal in the above-described manner is supplied to the first motor 41.

Figure 6:
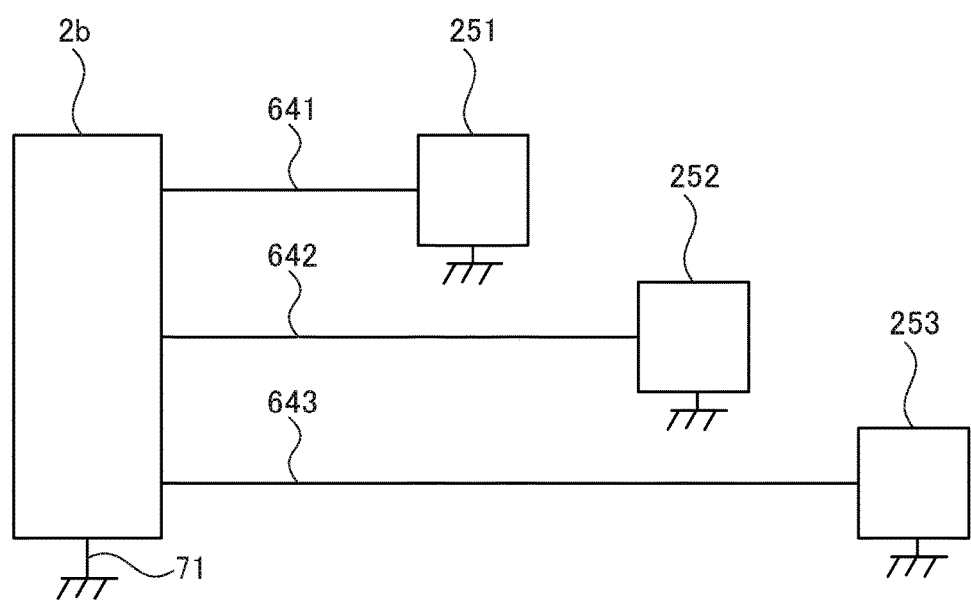
FIG. 6 is a system diagram of a control signal in the conduction path structure of a robot illustrated in FIG. 1.

FIG. 6 is a system diagram of a control signal in the conduction path structure of the robot illustrated in FIG. 1 and particularly illustrates a case in which the control signal is transmitted by serial communication using the conductive structural members 641, 642, and 643 of the fourth group of conduction paths 64 illustrated in FIG. 2. In FIG. 6, a control signal is supplied from a signal conversion circuit 251 to a power conversion circuit (not illustrated in FIG. 6) formed by the converter 202 and the inverter 203 illustrated in FIG. 5. The power conversion circuit operates according to an output signal of the signal conversion circuit 251 and driving power is supplied to the first motor 41. Similarly, a signal conversion circuit 252 is provided in a power conversion circuit that supplies driving power to the second motor 42. A signal conversion circuit 253 is provided in a power conversion circuit that supplies driving power to the third motor 43. That is, FIG. 5 illustrates a case in which a control signal is supplied from the control device 2b to the first motor 41 (a power conversion circuit formed by the converter 202 and the inverter 203) as a representative example. In contrast, as illustrated in FIG. 6, control signals are supplied from the signal conversion circuits 252 and 253 to the power conversion circuits of the second and third motors 42 and 43 similarly.

Specifically, a control signal is supplied to the signal conversion circuit 251 corresponding to the power conversion circuit (the power conversion circuit formed by the converter 202 and the inverter 203 illustrated in FIG. 5) that supplies driving power to the first motor 41 through one conductive structural member 641 among the three conductive structural members of the fourth group of conduction paths illustrated in FIG. 2. Moreover, a control signal is supplied to the signal conversion circuit 252 corresponding to the power conversion circuit (not illustrated) that supplies driving power to the second motor 42 through another conductive structural member 642 among the three conductive structural members of the fourth group of conduction paths illustrated in FIG. 2. Furthermore, a control signal is supplied to the signal conversion circuit 253 corresponding to the power conversion circuit (not illustrated) that supplies driving power to the third motor 43 through another conductive structural member 643 among the three conductive structural members of the fourth group of conduction paths illustrated in FIG. 2.

In this case, one corner structural member 71 among the four conductive corner structural members illustrated in FIG. 2, for example, may be applied to a common line for the three conductive structural members 641, 642, and 643 used as signal lines. In this way, the respective control signals which are serial signals from the control device 2b are supplied to the corresponding signal conversion circuits 251, 252, and 253 through the three conductive structural members 641, 642, and 643. Appropriate control is performed on the first, second, and third motors 41, 42, and 43.

As clear from the description of the embodiment, the conduction path structure of the robot according to the present invention includes the structural mechanism 100 which functions as a support and has the conductor portion (the conductive structural members 611, 612, and 613; the conductive structural members 621, 622, and 623; the conductive structural members 631, 632, and 633; and the conductive structural members 641, 642, and 643); the actuator (31, 32, 33) that operates the structural mechanism 100; and the conduction path (61, 62, 63, 64) through which driving power and/or a control signal is supplied to the actuator (31, 32, 33), wherein the conduction path (61, 62, 63, 64) also serves as the conductor portion of the structural mechanism 100 (the first to third arms: 11, 12, 13). Therefore, it is possible to realize a conduction path structure of a robot in which a conduction path has a simplified structure without using additional power supply cables and the like.

The present invention is not limited to the above-described embodiment of the present invention but can be modified in various ways. For example, in the embodiment described with reference to FIG. 2, although the arm (the first arm 11) of the robot has an approximately square sectional shape, the sectional shape is not limited thereto but may be a circular shape. Beside this, modifications and improvements made within a range where the object of the present invention can be attained also fall within the scope of the present invention.

EXPLANATION OF REFERENCE NUMERALS

1: Robot
2, 2a, 2b: Control device
3: Cable
4: Power supply
10: Base portion
11: First arm
12: Second arm
13: Third arm
14: Hand
21: First joint
22: Second joint
23: Third joint
31: First actuator
32: Second actuator
33: Third actuator
41: First motor
42: Second motor
43: Third motor
51: First coating member
52: Second coating member
53: Third coating member
61: First group of conduction paths
62: Second group of conduction paths
63: Third group of conduction paths
64: Fourth group of conduction paths
71, 72, 73, 74: Corner structural member
71a, 71b: Structural plate
71c, 71d: Bonding plate
100: Structural mechanism
201, 201a: Control unit
202: Converter
203: Inverter
251, 252, 253: Signal conversion circuit
611, 612, 613: Conductive structural member
621, 622, 623: Conductive structural member
631, 632, 633: Conductive structural member
641, 642, 643: Conductive structural member
611a: Structural plate
611b, 611c: Bonding plate
650: Structure adhesive

What is claimed is:

1. A conduction path structure of a robot, comprising:
    a structural mechanism which functions as a support and has plural conductor portions formed side by side along a circumferential direction so as to form a rigid skeletal portion surrounding an inner area of the structural mechanism;
    an actuator that operates the structural mechanism; and
    a conduction path through which driving power and/or a control signal is supplied to the actuator, wherein
    the conduction path is comprised of the plural conductor portions.

2. The conduction path structure of the robot according to claim 1, wherein
    the structural mechanism further includes a cover that covers an outer surface of the structural mechanism and is formed of an insulating flexible material.

3. The conduction path structure of the robot according to claim 1, wherein
    the structural mechanism forms an arm of the robot in which the plural conductor portions, serving as electrically independent conduction paths, are coupled with an insulating member interposed therebetween.

4. The conduction path structure of the robot according to claim 3, wherein
    the conduction path of the arm forms a power supply conductor that supplies an output of a power supply source to a motor which is a driving source of the actuator.

5. The conduction path structure of the robot according to claim 3, wherein
    the conduction path of the arm forms a control signal conductor that supplies a control signal to the actuator.

* * * * *